US012405417B2

(12) United States Patent
Chen et al.

(10) Patent No.: US 12,405,417 B2
(45) Date of Patent: Sep. 2, 2025

(54) LIGHT EMITTING MULTI FAN DEVICE

(71) Applicant: Purple Cloud Development Pte. Ltd., Singapore (SG)

(72) Inventors: Yuan chin Chen, Singapore (SG); Shiman Xu, Singapore (SG)

(73) Assignee: COOLER MASTER CO., LTD., Taipei (TW)

( * ) Notice: Subject to any disclaimer, the term of this patent is extended or adjusted under 35 U.S.C. 154(b) by 0 days.

(21) Appl. No.: 18/898,688

(22) Filed: Sep. 27, 2024

(65) Prior Publication Data

US 2025/0102726 A1 Mar. 27, 2025

(30) Foreign Application Priority Data

Sep. 27, 2023 (CN) .......................... 202311265107.4

(51) Int. Cl.
| | | |
|---|---|---|
| *F21V 33/00* | (2006.01) | |
| *F04D 25/16* | (2006.01) | |
| *F04D 29/64* | (2006.01) | |
| *F21V 8/00* | (2006.01) | |
| *F21V 23/00* | (2015.01) | |

(52) U.S. Cl.
CPC ......... *G02B 6/0088* (2013.01); *F04D 25/166* (2013.01); *F04D 29/646* (2013.01); *F21V 23/005* (2013.01); *F21V 33/0096* (2013.01)

(58) Field of Classification Search
CPC ............ H05K 7/20172; F04D 25/0613; F04D 29/005; F04D 29/526; F04D 29/00; F04D 25/166; F04D 19/002; F21V 33/0052; F21V 33/0096; F21V 23/005; G06F 1/20; F21Y 2103/33; F21Y 2107/10; F21Y 2115/10

See application file for complete search history.

(56) References Cited

U.S. PATENT DOCUMENTS

| | | | |
|---|---|---|---|
| 10,690,336 B1* | 6/2020 | Chen | ...................... G06F 1/20 |
| 10,736,232 B1* | 8/2020 | Ou | ................ H05K 7/20172 |
| 2002/0015648 A1* | 2/2002 | Kosugi | ................ F04D 29/602 416/247 R |
| 2006/0083606 A1* | 4/2006 | Kosugi | ................ F04D 19/007 415/118 |
| 2007/0243816 A1* | 10/2007 | Russak | ................ F04D 25/166 454/208 |
| 2017/0331346 A1* | 11/2017 | Lai | ...................... F04D 25/0693 |
| 2019/0297687 A1* | 9/2019 | Kim | ..................... H05B 6/1263 |
| 2020/0053910 A1* | 2/2020 | Chen | ....................... G06F 1/186 |

* cited by examiner

*Primary Examiner* — Fatima N Farokhrooz
(74) *Attorney, Agent, or Firm* — Merchant & Gould P.C.

(57) ABSTRACT

A light emitting multi fan device may include a mount rack, fan frame, light guide plate, plurality of fans, and plurality of fixing assemblies. The plurality of fans is rotatably coupled to a rack frame of the mount rack. The fan frame is coupled to the mount rack and respectively surrounds each plurality of fans. The light guide plate is coupled to the fan frame and the rack frame. Each plurality of fixing assemblies includes a locking element and a receiving through hole. The locking element protrudes from the fan frame and the receiving through hole extends through the rack frame. The plurality of fixing assemblies is configured to enable the fan frame to lock the light guide plate between the fan frame and the rack frame via a pushing force.

14 Claims, 9 Drawing Sheets

LIGHT EMITTING MULTI FAN DEVICE

RELATED APPLICATIONS

This US application claims the benefit of priority to China application no. 202311265107.4, filed on Sep. 27, 2023, of which is incorporated herein by reference in its entirety.

TECHNICAL FIELD

The present disclosure relates to heat-transfer components and assemblies, and more particularly, but not limited to, light emitting multi fan devices.

BACKGROUND OF THE INVENTION

With increasing processing speed and performance of electronic devices, the amount of heat generated during operation of an electronic device has increased. The heat generation increases the temperature of the electronic device and, if the heat cannot be dissipated effectively, the reliability and performance of the electronic device is reduced. To prevent overheating of an electronic device, cooling systems such as air-cooling systems and liquid cooling systems are used to efficiently dissipate the heat generated by the electronic device and, thereby ensure the standard operation of the electronic device.

In the case of light emitting multi fan devices or other rotating cooling apparatuses of air-cooling systems, lighting such as light-emitting diode (LED) lights, LED strip lights, or LED bar lights are assembled to the multi fan devices for illumination of fans and electronic devices. However, to achieve illumination of the fans, multiple parts and LED light sources are added, making assembly time-consuming, and increasing the risk of lost parts. Also, maintenance, repair, and parts replacement become more inconvenient and inefficient. Moreover, vibration of the multi fan devices due to use of more than one fan increases. As vibration increases, misalignment may occur, causing vibration noises to increase and fasteners to loosen.

SUMMARY OF THE INVENTION

The present disclosure provides a light emitting multi fan device with decreased parts, simplified assembly, illumination and decreased vibration.

In some aspects, the techniques described herein relate to a light emitting multi fan device including a mount rack, a plurality of fans, a fan frame, a light guide plate, and a plurality of fixing assemblies. The mount rack includes a rack frame and the plurality of fans is rotatably coupled to the rack frame. The fan frame is coupled to the mount rack and respectively surrounds each plurality of fans. The light guide plate is coupled to the fan frame and the rack frame. Each plurality of fixing assemblies includes a locking element and a receiving through hole. The locking element protrudes from the fan frame and the receiving through hole extends through the rack frame. The plurality of fixing assemblies is configured to enable the fan frame to lock the light guide plate between the fan frame and the rack frame via a pushing force. In some aspects, the techniques described herein relate to a light emitting multi fan device, wherein the plurality of fixing assemblies comprises eight plurality of fixing assemblies and two plurality of fixing assemblies are disposed between each neighboring plurality of fans.

In some aspects, the techniques described herein relate to a light emitting multi fan device, wherein the fan frame includes a cover portion, a side wall portion, and a plurality of fan wall portions. The cover portion includes at least four perimeter edges and a plurality of fan perimeter edges. The side wall portion extend from three at least four perimeter edges and the light guide plate extend from one at least four perimeter edges. Each plurality of fan wall portions extend from each plurality of fan perimeter edges. Each plurality of fan wall portions define a fan space and each plurality of fans is disposed in each respective fan space.

In some aspects, the techniques described herein relate to a light emitting multi fan device, further including a driver circuit board. The driver circuit board includes a plurality of light sources and at least one connector. The driver circuit board is coupled to the mount rack and configured to drive the plurality of fans to rotate and the plurality of light sources to emit light. The light guide plate includes an illumination surface. The light guide plate and each plurality of fan wall portions define a cavity. Emitted light is directed to the illumination surface via the cavity.

In some aspects, the techniques described herein relate to a light emitting multi fan device, wherein each plurality of fans includes a plurality of blades and a hub. The plurality of blades extend outward from the hub. The mount rack further includes a plurality of shafts. The driver circuit board and each plurality of fans is coupled to the mount rack via the plurality of shafts. In some aspects, the techniques described herein relate to a light emitting multi fan device, wherein the plurality of fans includes three plurality of fans.

In some aspects, the techniques described herein relate to a light emitting multi fan device, further including a plurality of positioning assemblies. Each plurality of positioning assemblies includes a pair of positioning components and a receiving slot. The pair of positioning components protrude from the fan frame and the rack frame. The receiving slot extends toward an interior of the light emitting multi fan device from the light guide plate. Each pair of positioning components respectively protrudes within each receiving slot. In some aspects, the techniques described herein relate to a light emitting multi fan device, wherein the plurality of positioning assemblies further includes two plurality of positioning assemblies. In some aspects, the techniques described herein relate to a light emitting multi fan device, wherein each plurality of fans is linearly disposed, and each plurality of positioning assemblies is disposed between each neighboring plurality of fans. The pair of positioning components and the receiving slot are disposed between the plate positioning component and the pair of plate receiving slots.

In some aspects, the techniques described herein relate to a light emitting multi fan device, wherein each plurality of positioning assemblies further includes a plate positioning component and a pair of plate receiving slots. The plate positioning component protrudes from an upper edge and a lower edge of the light guide plate. The pair of plate receiving slots respectively extends within the fan frame and the rack frame. Each plate positioning component respectively protrudes within each pair of plate receiving slots. In some aspects, the techniques described herein relate to a light emitting multi fan device, wherein the plate positioning component includes two plate positioning components, and the pair of plate receiving slots includes two pair of plate receiving slots. Two respective ends of the two plate positioning components extend within two of the two pair of plate receiving slots extending within the fan frame and two respective ends of the two plate positioning components extend within two of the two pair of plate receiving slots extending with the rack frame.

In some aspects, the techniques described herein relate to a light emitting multi fan device, wherein the light guide plate includes a plurality of first support elements. Each plurality of first support elements extend toward an interior of the light emitting multi fan device and respective ends of each plurality of first support elements abut the fan frame and the rack frame. The rack frame includes a plurality of second support elements. Each plurality of second support elements protrude from an interior surface of the rack frame and a respective end of each plurality of second support elements abut the fan frame. In some aspects, the techniques described herein relate to a light emitting multi fan device, wherein the plurality of first support elements comprises two plurality of first support elements and the two plurality of first support elements are disposed between each neighboring plurality of fans, and the plurality of second support elements comprises two plurality of second support elements and the two plurality of second support elements are disposed between each neighboring plurality of fans, opposite the plurality of first support elements.

In some aspects, the techniques described herein relate to a light emitting multi fan device, wherein the locking element includes a retaining part. The retaining part protrudes from a second end of the locking element opposite from the fan frame. The rack frame includes a plurality of lower exterior depressions and the fan frame includes a plurality of upper exterior depressions. When the fan frame locks the light guide plate between the fan frame and the rack frame, each locking element respectively protrudes through each receiving through hole, and each retaining part respectively abuts each plurality of lower exterior depressions.

In some aspects, the techniques described herein relate to a light emitting multi fan device, wherein the plurality of lower exterior depressions includes eight plurality of lower exterior depressions and the plurality of upper exterior depressions includes eight plurality of upper exterior depressions. In some aspects, the techniques described herein relate to a light emitting multi fan device, further including a plurality of elastic covers. The plurality of elastic covers include anti vibration material. The plurality of elastic covers is respectively coupled within the plurality of lower exterior depressions and the plurality of upper exterior depressions.

BRIEF DESCRIPTION OF DRAWINGS

Unless specified otherwise, the accompanying drawings illustrate aspects of the innovative subject matter described herein. Referring to the drawings, wherein like reference numerals indicate similar parts throughout the several views, several examples of light emitting multi fan devices incorporating aspects of the presently disclosed principles are illustrated by way of example, and not by way of limitation.

DETAILED DESCRIPTION

The following describes various principles related to components and assemblies for electronic devices cooling by way of reference to specific examples of light emitting multi fan devices, including specific arrangements and examples of mount racks, fan frames, light guide plates embodying innovative concepts. More particularly, but not exclusively, such innovative principles are described in relation to selected examples of fixing assemblies and positioning assemblies, and well-known functions or constructions are not described in detail for purposes of succinctness and clarity. Nonetheless, one or more of the disclosed principles can be incorporated in various other embodiments of fixing assemblies and positioning assemblies to achieve any of a variety of desired outcomes, characteristics, and/or performance criteria.

Thus, fixing assemblies and positioning assemblies having attributes that are different from those specific examples discussed herein can embody one or more of the innovative principles, and can be used in applications not described herein in detail. Accordingly, embodiments of fixing assemblies and positioning assemblies not described herein in detail also fall within the scope of this disclosure, as will be appreciated by those of ordinary skill in the relevant art following a review of this disclosure.

Example embodiments as disclosed herein are directed to light emitting multi fan devices that can be used in cooling systems to dissipate high heat loads. The light emitting multi fan devices may be configured on a chassis, within a chassis, or as part of an electronics system that includes heat producing electronic components to be cooled. The cooling system includes at least one light emitting multi fan device. The light emitting multi fan device may be coupled to the chassis via a fastener (e.g., bolts, screws, etc.), transporting air to heat producing electronic components to be cooled and/or to an outside of the chassis or electronics system. The light emitting multi fan devices may be coupled to the back end of a radiator via a fastener at structural portions of the radiator, transporting air through the radiator to an air plenum or to the outside of the chassis or electronics system.

Figure 1A:
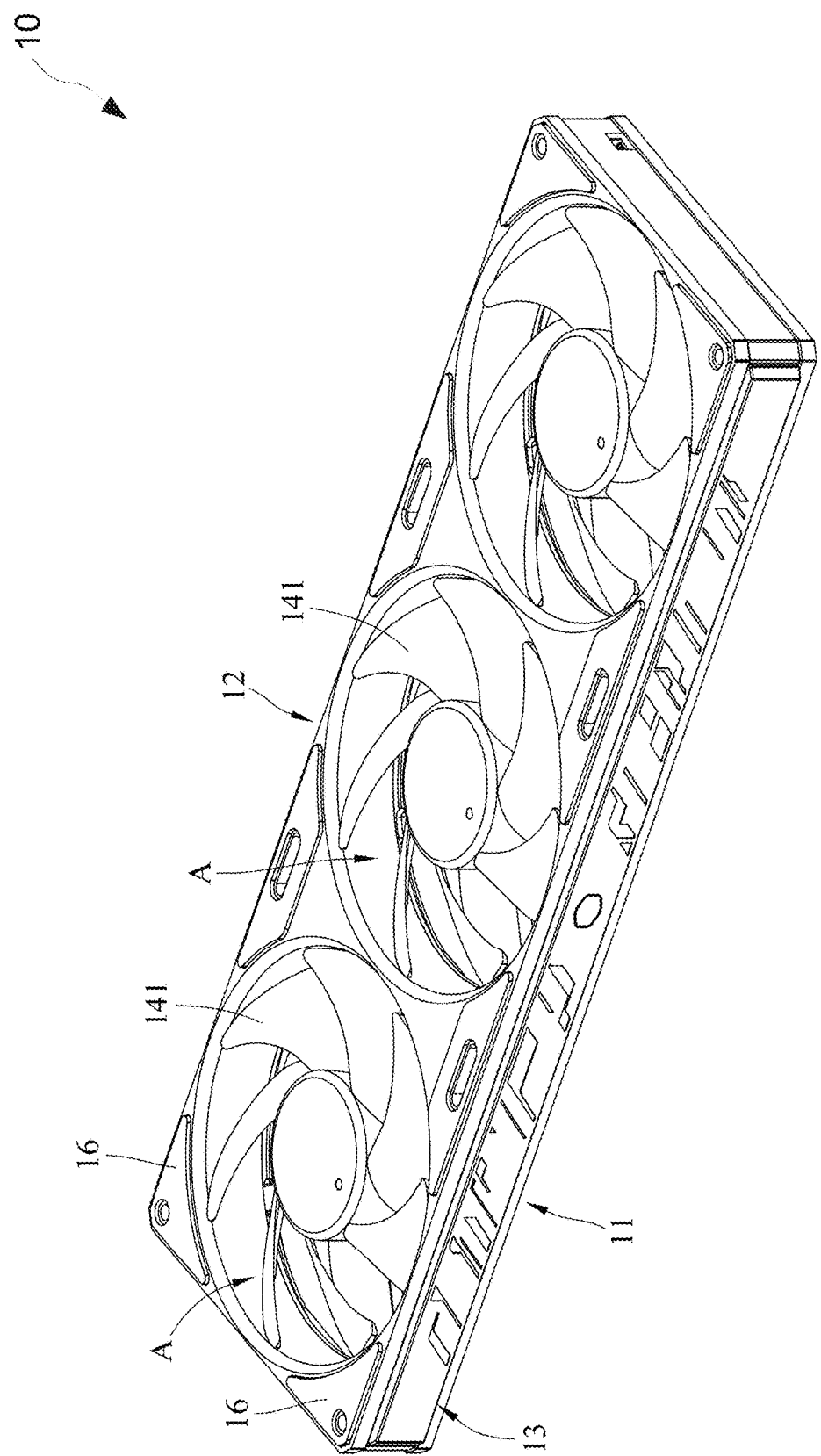
FIG. 1A illustrates a perspective view of a light emitting multi fan device, in accordance with various embodiments of the present disclosure.
Figure 1B:
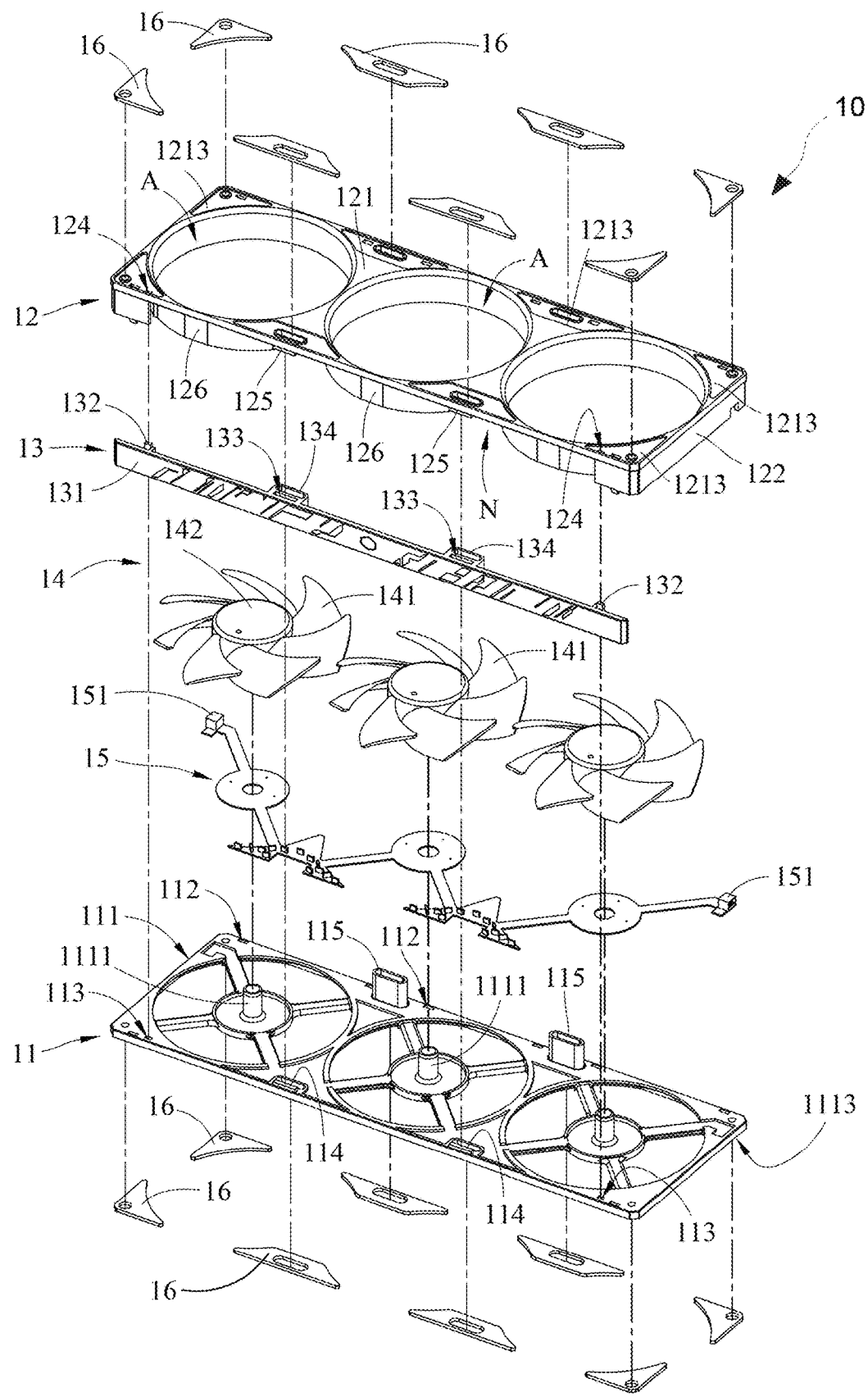
FIG. 1B illustrates an exploded view of the light emitting multi fan device of FIG. 1A, in accordance with various embodiments of the present disclosure.
Figure 2:
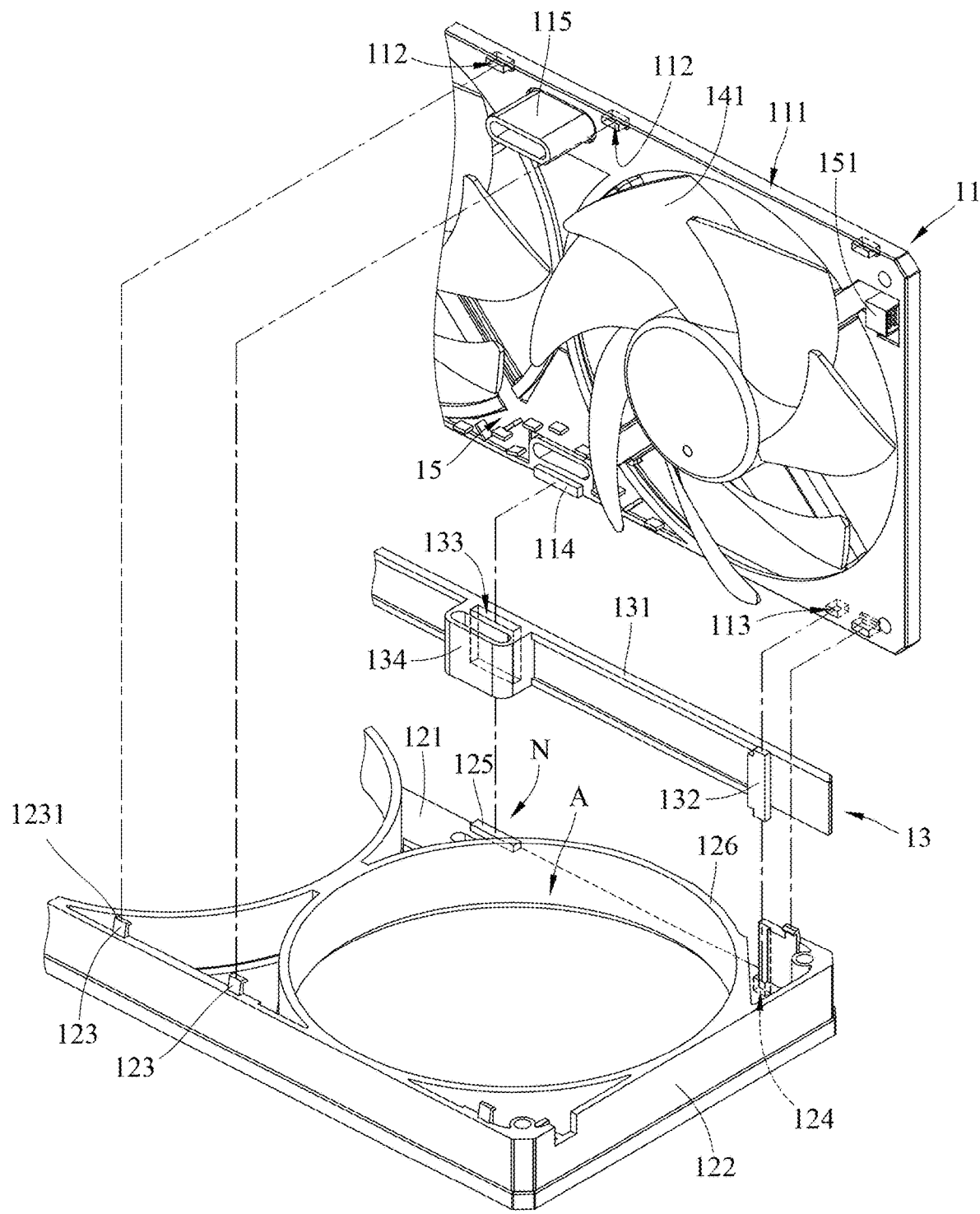
FIG. 2 illustrates a partial exploded view of the light emitting multi fan device of FIG. 1A, in accordance with various embodiments of the present disclosure.
Figure 3:
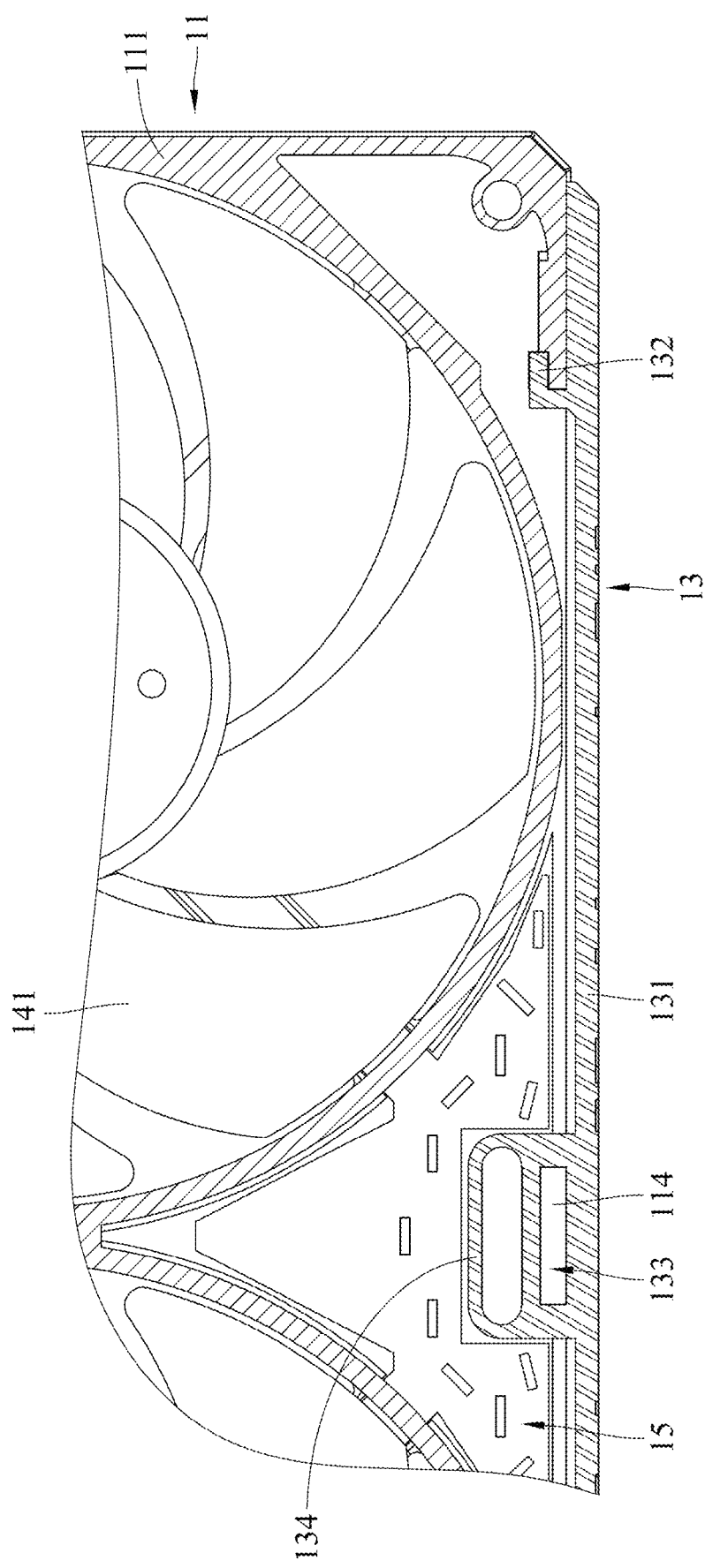
FIG. 3 illustrates a partial cross-sectional view of the light emitting multi fan device of FIG. 1A, in accordance with various embodiments of the present disclosure.
Figure 4:
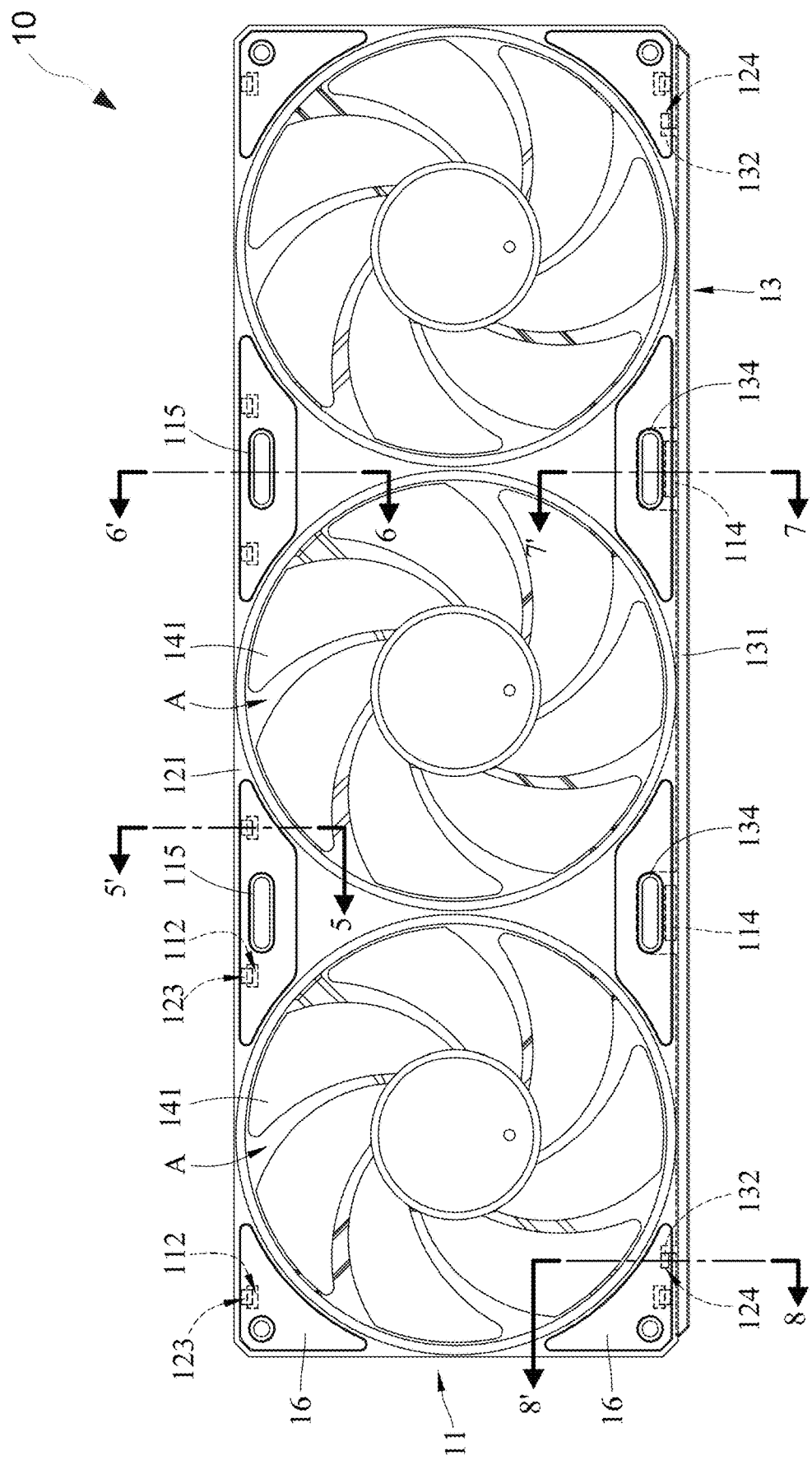
FIG. 4 illustrates another perspective view of the light emitting multi fan device of FIG. 1A, having line 5-5', line 6-6', line 7-7' and line 8-8' cross-sections, in accordance with various embodiments of the present disclosure.
Figure 5:
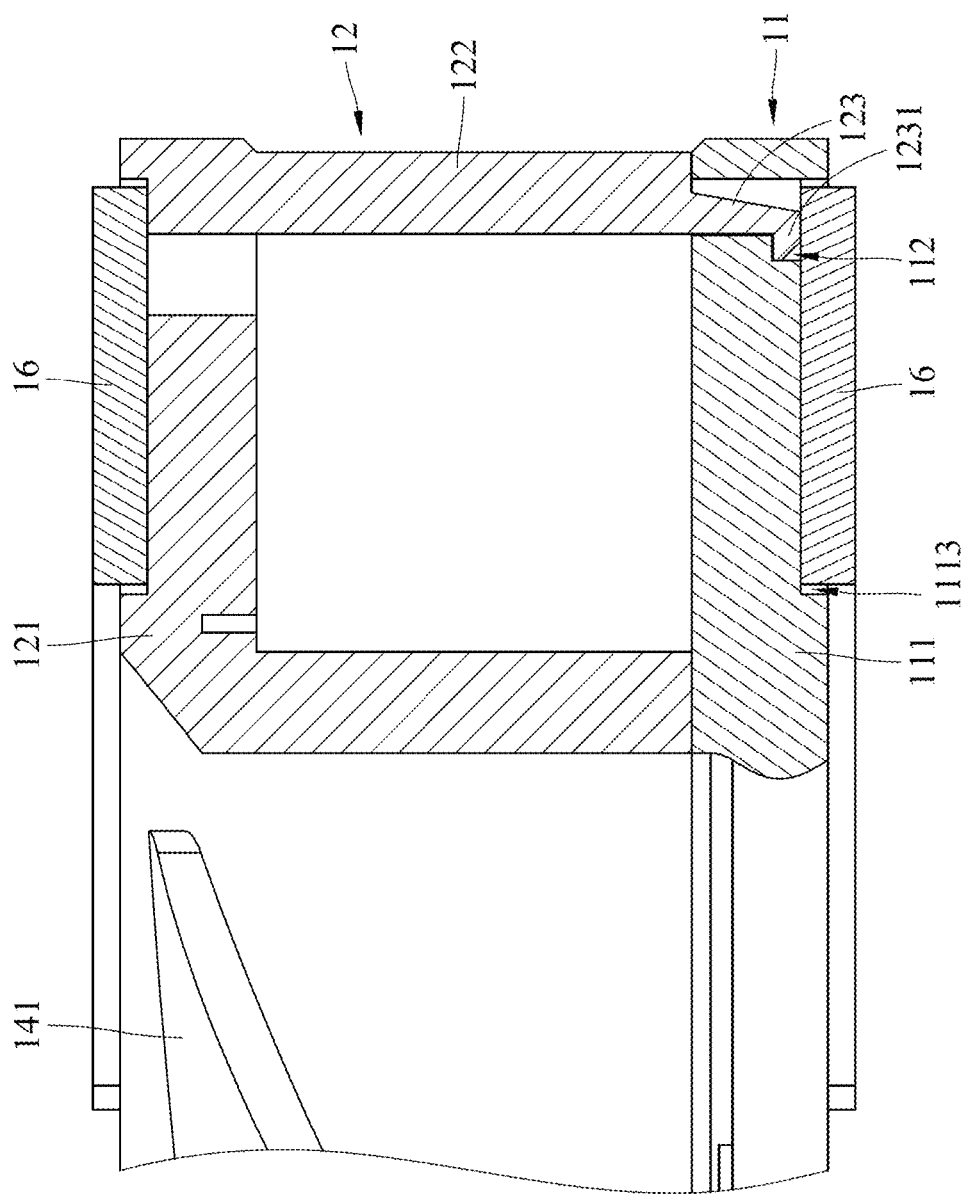
FIG. 5 illustrates a cross-section along line 5-5' of the multi fan assembly of FIG. 4, in accordance with various embodiments of the present disclosure.
Figure 6:
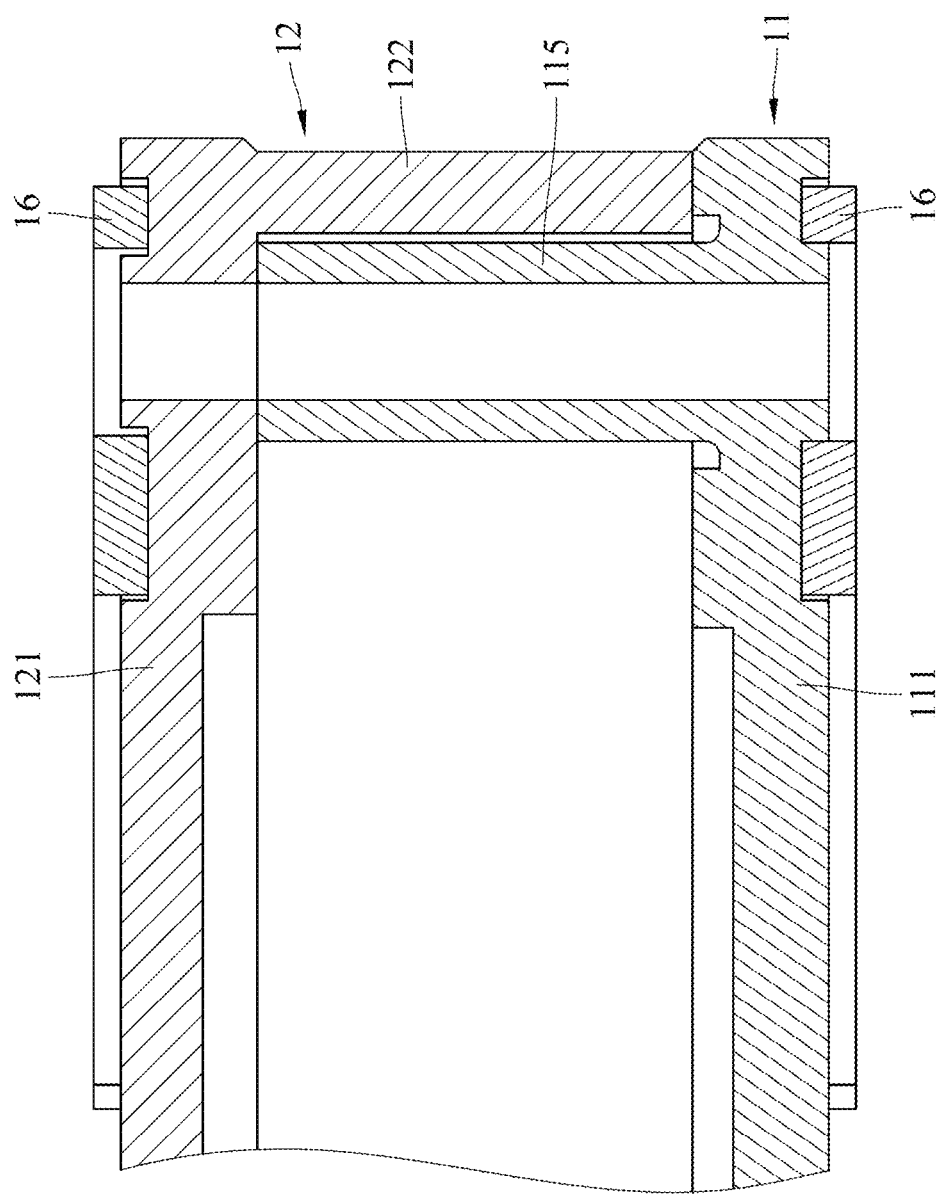
FIG. 6 illustrates a cross-section along line 6-6' of the multi fan assembly of FIG. 4, in accordance with various embodiments of the present disclosure.
Figure 7:
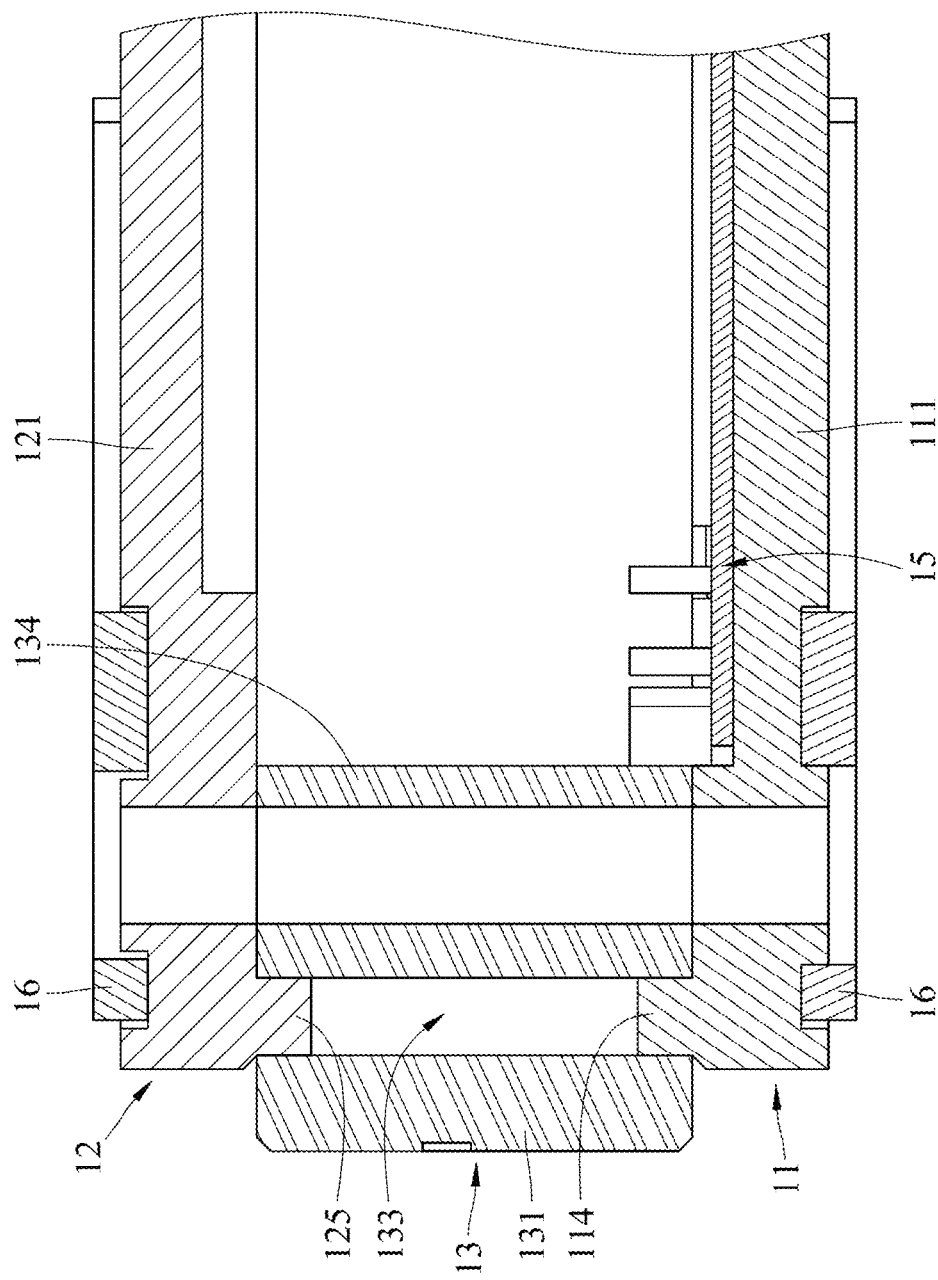
FIG. 7 illustrates a cross-section along line 7-7' of the multi fan assembly of FIG. 4, in accordance with various embodiments of the present disclosure.
Figure 8:
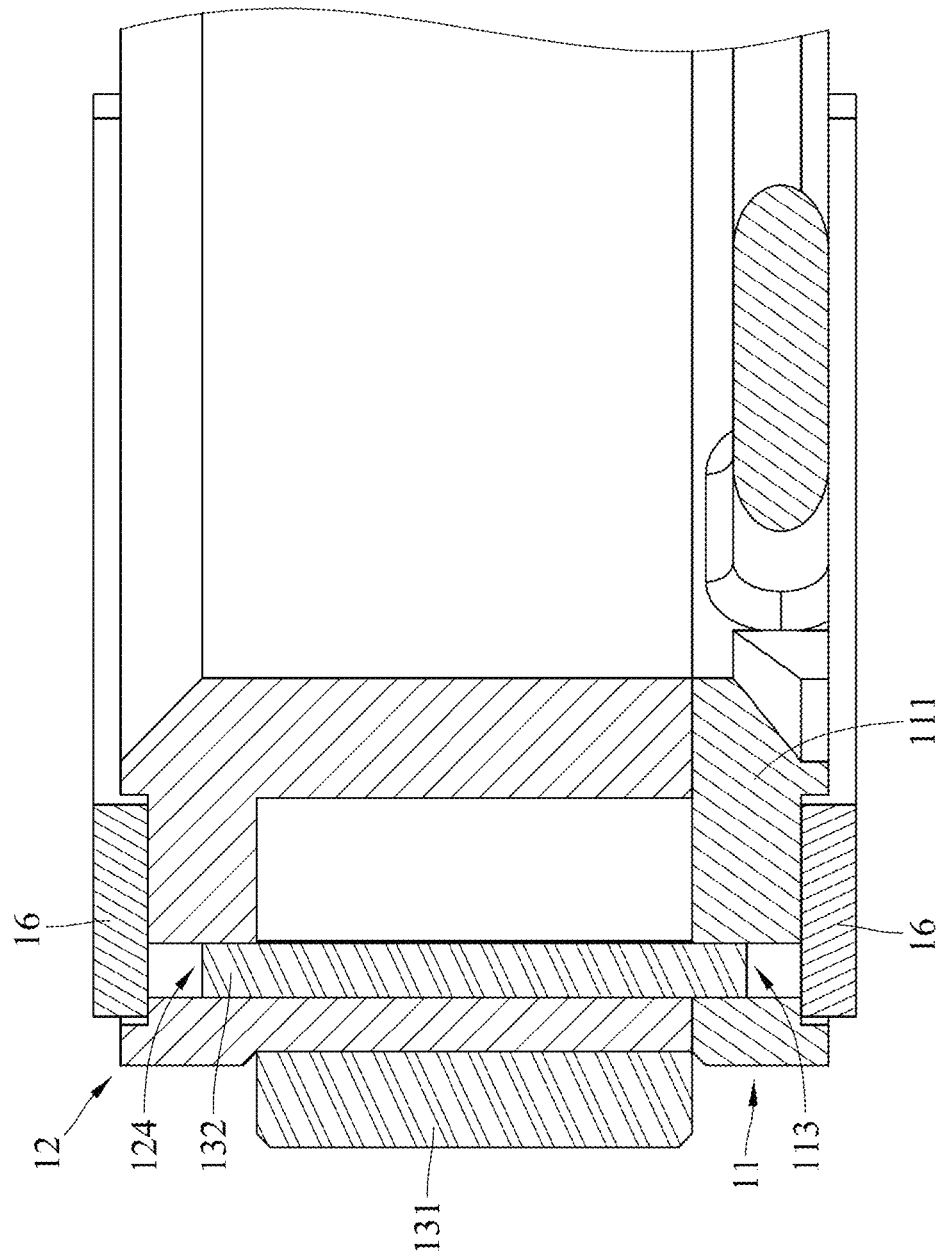
FIG. 8 illustrates a cross-section along line 8-8' of the multi fan assembly of FIG. 4, in accordance with various embodiments of the present disclosure.

FIGS. 1A to 1B illustrate a light emitting multi fan device 10, in accordance with various embodiments of the present disclosure. In some embodiments, the light emitting multi fan device 10 includes a mount rack 11, a plurality of fans 14, a fan frame 12, a light guide plate 13, and a plurality of fixing assemblies. The mount rack 11 includes a rack frame 111 and the plurality of fans 14 is rotatably coupled to the rack frame 111. The fan frame 12 is coupled to the mount rack 11 and respectively surrounds each plurality of fans 14. The light guide plate 13 is coupled to the fan frame 12 and the rack frame 111. Each plurality of fixing assemblies includes a locking element 123 and a receiving through hole 112. The locking element 123 protrudes from the fan frame 12 and the receiving through hole 112 extends through the rack frame 111. The plurality of fixing assemblies is configured to enable the fan frame 12 to lock the light guide plate 13 between the fan frame 12 and the rack frame 111 via a pushing force.

In some embodiments, the plurality of fixing assemblies comprises eight plurality of fixing assemblies and two plurality of fixing assemblies are disposed between each neighboring plurality of fans 14. In some embodiments, the plurality of fans 14 includes three plurality of fans 14 and four plurality of fixing assemblies are disposed at four corners of the light emitting multi fan device 10, and two plurality of fixing assemblies are disposed between a first and a second of the neighboring three plurality of fans 14 and two plurality of fixing assemblies are disposed between the second and a third of the neighboring three plurality of fans 14. In some embodiments, the plurality of fans 14 includes less than three plurality of fans 14.

In some embodiments, the fan frame 12 includes a cover portion 121, a side wall portion 122, and a plurality of fan wall portions 126. The cover portion 121 includes at least four perimeter edges and a plurality of fan perimeter edges. The side wall portion 122 perpendicularly extend from three at least four perimeter edges and the light guide plate 13 perpendicularly extend from one at least four perimeter edges. Each plurality of fan wall portions 126 extend from each plurality of fan perimeter edges. Each plurality of fan wall portions 126 define a fan space A, the fan space A is circular, and each plurality of fans 14 is rotatably disposed in each respective fan space A.

In some embodiments, a light emitting multi fan device 10 further includes a driver circuit board 15. The driver circuit board 15 includes a plurality of light sources and at least one connector 151. The driver circuit board 15 is coupled to the mount rack 11 and configured to drive the plurality of fans 14 to rotate and the plurality of light sources to emit light. The light guide plate 13 includes an illumination surface 131. The light guide plate 13 and each plurality of fan wall portions 126 define a cavity N. Emitted light is directed to the illumination surface 131 via the cavity N. In some embodiments, the at least one connector 151 includes two at least one connector 151 and each two at least one connector 151 is disposed at a corner of the light emitting multi fan device 10. In some embodiments, the illumination surface 131 is made of transparent materials. In some embodiments, the illumination surface 131 displays patterns, pictures or words.

In some embodiments, each plurality of fans 14 includes a plurality of blades 141 and a hub 142. The plurality of blades 141 extend outward from the hub 142. The mount rack 11 further includes a plurality of shafts 1111. The driver circuit board 15 and each plurality of fans 14 is coupled to the mount rack 11 via the plurality of shafts 1111.

The zig-zag shape of the driver circuit board 15 for each neighboring plurality of fans 14, the shape of the depressions and walls of the rack frame 111 being the same as the perimeter of the driver circuit board 15, and each plurality of fans 14 being coupled to the mount rack 11 via the plurality of shafts 1111 provide structural stability of the driver circuit board 15 and each plurality of fans 14, decreasing vibration and noise when the plurality of fans 14 is rotating.

In some embodiments, the locking element 123 includes a retaining part 1231. The retaining part 1231 protrudes from a second end of the locking element 123 opposite from the fan frame 12. The rack frame 111 includes a plurality of lower exterior depressions 1113 and the fan frame 12 includes a plurality of upper exterior depressions 1213. When the fan frame 12 locks the light guide plate 13 between the fan frame 12 and the rack frame 111, each locking element 123 respectively protrudes through each receiving through hole 112, and each retaining part 1231 respectively abuts each plurality of lower exterior depressions 1113.

In some embodiments, the plurality of lower exterior depressions 1113 includes eight plurality of lower exterior depressions 1113 and the plurality of upper exterior depressions 1213 includes eight plurality of upper exterior depressions 1213. In some embodiments, four plurality of lower exterior depressions 1113 and four plurality of upper exterior depressions 1213 are respectively disposed at four exterior corners of the light emitting multi fan device 10. Two plurality of lower exterior depressions 1113 and two plurality of upper exterior depressions 1213 are respectively disposed between two neighboring plurality of fans 14 on one side and two plurality of lower exterior depressions 1113 and two plurality of upper exterior depressions 1213 are respectively disposed between two neighboring plurality of fans 14 on an opposite side. In some embodiments, a light emitting multi fan device 10 further includes a plurality of elastic covers 16. The plurality of elastic covers 16 include anti vibration material. The plurality of elastic covers 16 is respectively coupled within the plurality of lower exterior depressions 1113 and the plurality of upper exterior depressions 1213, absorbing vibration when the light emitting multi fan devices 10 of the embodiments are coupled to a chassis via fasteners. In some embodiments, the plurality of elastic covers 16 includes sixteen plurality of elastic covers 16.

FIGS. 2 to 8 illustrate partial views and cross-section views of the light emitting multi fan device 10, in accordance with various embodiments of the present disclosure. In some embodiments, the light emitting multi fan device 10 further includes a plurality of positioning assemblies. Each plurality of positioning assemblies includes a pair of positioning components 125, 114 and a receiving slot 133. The pair of positioning components 125, 114 protrude from the fan frame 12 and the rack frame 111. The receiving slot 133 extends toward an interior of the light emitting multi fan device 10 from the light guide plate 13. Each pair of positioning components 125, 114 respectively protrudes within each receiving slot 133. In some embodiments, the plurality of positioning assemblies further includes two plurality of positioning assemblies. In some embodiments, each plurality of fans 14 is linearly disposed, and each plurality of positioning assemblies is disposed between each neighboring plurality of fans 14. In some embodiments, each plurality of fans 14 is not linearly disposed.

In some embodiments, each plurality of positioning assemblies further includes a plate positioning component 132 and a pair of plate receiving slots 124, 113. The plate positioning component 132 protrudes from an upper edge and a lower edge of the light guide plate 13. The pair of plate receiving slots 124, 113 respectively extends within the fan frame 12 and the rack frame 111. Each plate positioning component 132 respectively protrudes within each pair of plate receiving slots 124, 113. In some embodiments, the plate positioning component 132 includes two plate positioning components 132, and the pair of plate receiving slots 124, 113 includes two pair of plate receiving slots 124, 113. Two respective ends of the two plate positioning components 132 extend within two of the two pair of plate receiving slots 124 extending within the fan frame 12 and two respective ends of the two plate positioning components 132 extend within two of the two pair of plate receiving slots 113 extending with the rack frame 111. The pair of positioning components 125, 114 and the receiving slot 133 are disposed between the plate positioning component 132 and the pair of plate receiving slots 124, 113.

In some embodiments, the light guide plate 13 includes a plurality of first support elements 134. Each plurality of first support elements 134 extend toward an interior of the light emitting multi fan device 10 and respective ends of each plurality of first support elements 134 abut the fan frame 12 and the rack frame 111. The rack frame 111 includes a plurality of second support elements 115. Each plurality of second support elements 115 protrude from an interior surface of the rack frame 111 and a respective end of each plurality of second support elements 115 abut the fan frame 12. In some embodiments, the plurality of first support elements 134 comprises two plurality of first support elements 134 and the two plurality of first support elements 134 are disposed between each neighboring plurality of fans 14, and the plurality of second support elements 115 comprises two plurality of second support elements 115 and the two plurality of second support elements 115 are disposed between each neighboring plurality of fans 14, opposite the plurality of first support elements 134. In some embodiments, the plurality of first support elements 134 and the plurality of second support elements 115 comprise tubular structures.

The two plurality of fixing assemblies, the two plurality of first support elements 134, the two plurality of second support elements 115, and each plurality of positioning assemblies, being disposed between each neighboring plurality of fans 14, provide structural stability of the light emitting multi fan devices 10 of the embodiments, decreasing vibration and noise.

Aesthetic illumination with decreased parts provide convenient, efficient, and simplified assembly of the light emitting multi fan devices 10 of the embodiments. One driver circuit board 15 drives each plurality of fans 14 to rotate and the plurality of light sources to emit light, whereby the one driver circuit board 15 and each plurality of fans 14 is coupled to the mount rack 11 via the plurality of shafts 1111. The fan frame 12 locks the light guide plate 13 between the fan frame 12 and rack frame 111 via the plurality of fixing assemblies, assembling the light emitting multi fan devices 10 together via snap-fit joints and defining a cavity N between the light guide plate 13 and each plurality of fan wall portions 126 for emitted light to be directed to the illumination surface 131 of the light guide plate 13. Screws, bolts, other fasteners and fastening tools, and additional LED strip lights or LED bar lights are eliminated for assembling the light emitting multi fan devices 10 of the embodiments.

Moreover, stabilizing elements, assemblies, and covers provide decreased vibration of the light emitting multi fan devices 10 of the embodiments. The zig-zag shape of the driver circuit board 15 for each neighboring plurality of fans 14, the shape of the depressions and walls of the rack frame 111 being the same as the perimeter of the driver circuit board 15, and each plurality of fans 14 being coupled to the mount rack 11 via the plurality of shafts 1111 provide structural stability of the driver circuit board 15 and each plurality of fans 14, decreasing vibration when operating. Furthermore, the two plurality of fixing assemblies, the two plurality of first support elements 134, the two plurality of second support elements 115, and each plurality of positioning assemblies, being disposed between each neighboring plurality of fans 14, provide structural stability of the light emitting multi fan devices 10 of the embodiments, further decreasing vibration. Even furthermore, the sixteen plurality of elastic covers 16 absorb vibration when the light emitting multi fan devices 10 are coupled to a chassis via fasteners. Thus, noise and misalignment due to loosened fasteners are decreased.

Light emitting multi fan devices 10 with decreased parts and simplified assembly having more convenient and efficient maintenance, repair, and parts replacement, and illumination, and decreased vibration are provided.

Therefore, embodiments disclosed herein are well adapted to attain the ends and advantages mentioned as well as those that are inherent therein. The particular embodiments disclosed above are illustrative only, as the embodiments disclosed may be modified and practiced in different but equivalent manners apparent to those of ordinary skill in the relevant art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some number. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces.

The invention claimed is:
1. A light emitting multi fan device, comprising:
a mount rack including a rack frame;
a plurality of fans rotatably coupled to the rack frame;
a fan frame coupled to the mount rack, the fan frame respectively surrounding each of the plurality of fans;
a linear light guide plate coupled to the fan frame and the rack frame; and
a plurality of fixing assemblies, each of the plurality of fixing assemblies including a locking element and a receiving through hole, the locking element protruding from the fan frame, the receiving through hole extending through the rack frame, wherein the plurality of fixing assemblies are configured to enable the fan frame to lock the linear light guide plate between the fan frame and the rack frame via a pushing force;

wherein the fan frame comprises a cover portion, a side wall portion, and a plurality of fan wall portions, the cover portion comprising at least four perimeter edges and a plurality of fan perimeter edges, the side wall portion extending from three of the at least four perimeter edges, the linear light guide plate extending from one of the at least four perimeter edges and being disposed in a vertical position in a thickness direction and extends through out one of the long sides of the fan frame, each of the plurality of fan wall portions extending from each of the plurality of fan perimeter edges, each of the plurality of fan wall portions defining a fan space, each of the plurality of fans disposed in each respective fan space;

wherein the locking element comprises a retaining part, the retaining part protruding from a second end of the locking element opposite from the fan frame, and wherein the rack frame comprises a plurality of lower exterior depressions and the fan frame comprises a plurality of upper exterior depressions, when the fan frame locks the linear light guide plate between the fan frame and the rack frame, each locking element respectively protrudes through each receiving through hole, and each retaining part respectively abuts each plurality of lower exterior depressions.

2. The light emitting multi fan device of claim 1, further comprising a driver circuit board, the driver circuit board including a plurality of light sources and at least one connector, the driver circuit board coupled to the mount rack and configured to drive the plurality of fans to rotate and the plurality of light sources to emit light, wherein the linear light guide plate comprises an illumination surface, the linear light guide plate and each of the plurality of fan wall portions define a cavity, emitted light is directed to the illumination surface via the cavity.

3. The light emitting multi fan device of claim 1, wherein the plurality of lower exterior depressions comprises eight plurality of lower exterior depressions and the plurality of upper exterior depressions comprises eight plurality of upper exterior depressions.

4. The light emitting multi fan device of claim 1, further comprising a plurality of elastic covers, the plurality of elastic covers comprising anti vibration material, the plurality of elastic covers respectively coupled within the plurality of lower exterior depressions and the plurality of upper exterior depressions.

5. The light emitting multi fan device of claim 1, further comprising a plurality of positioning assemblies, each of the plurality of positioning assemblies including a pair of positioning components and a receiving slot, the pair of positioning components protruding from the fan frame and the rack frame, the receiving slot extending toward an interior of the light emitting multi fan device from the linear light guide plate, each pair of positioning components respectively protruding within each receiving slot.

6. The light emitting multi fan device of claim 1, further comprising a plurality of positioning assemblies, each of the plurality of positioning assemblies further including a plate positioning component and a pair of plate receiving slots, the plate positioning component protruding from an upper edge and a lower edge of the linear light guide plate, the pair of plate receiving slots respectively extending within the fan frame and the rack frame, each plate positioning component respectively protrudes within each pair of plate receiving slots.

7. The light emitting multi fan device of claim 1, wherein the linear light guide plate comprises a plurality of first support elements, each of the plurality of first support elements extending toward an interior of the light emitting multi fan device and respective ends of each plurality of first support elements abutting the fan frame and the rack frame, and wherein the rack frame comprises a plurality of second support elements, each of the plurality of second support elements protrudes from an interior surface of the rack frame and a respective end of each of the plurality of second support elements abuts the fan frame.

8. The light emitting multi fan device of claim 1, wherein the plurality of fixing assemblies comprise eight fixing assemblies and two fixing assemblies are each disposed between neighboring fans of the plurality of fans.

9. The light emitting multi fan device of claim 1, wherein the plurality of fans comprises three fans.

10. The light emitting multi fan device of claim 2, wherein each of the plurality of fans comprises a plurality of blades and a hub, the plurality of blades extending outward from the hub, wherein the mount rack further includes a plurality of shafts, the driver circuit board and each of the plurality of fans is coupled to the mount rack via the plurality of shafts.

11. The light emitting multi fan device of claim 5, wherein the plurality of positioning assemblies further include two positioning assemblies.

12. The light emitting multi fan device of claim 5, wherein each of the plurality of fans is linearly disposed, and each of the plurality of positioning assemblies is disposed between each of the neighboring plurality of fans.

13. The light emitting multi fan device of claim 6, wherein the plurality of positioning assemblies comprise two plate positioning components, and two pair of plate receiving slots, two respective ends of the two plate positioning components extend within two of the two pair of plate receiving slots extending within the fan frame and two respective ends of the two plate positioning components extend within two of the two pair of plate receiving slots extending with the rack frame, the pair of positioning components and the receiving slot are disposed between the plate positioning component and the pair of plate receiving slots.

14. The light emitting multi fan device of claim 7, wherein the plurality of first support elements comprises two first support elements and the two first support elements are each disposed between neighboring fans of the plurality of fans, and wherein the plurality of second support elements comprises two second support elements and the two second support elements are each disposed between neighboring fans of the plurality of fans, opposite the plurality of first support elements.

* * * * *